Patented Oct. 14, 1952

2,614,119

UNITED STATES PATENT OFFICE 2,614,119

INHIBITION OF POLYMERIZATION OF ACRYLONITRILE

William T. Nichols, Kirkwood, Mo., assignor to Monsanto Chemical Company, St. Louis, Mo., a corporation of Delaware No Drawing. Application April 9, 1951, Serial No. 220,141

4 Claims. (Cl. 260—465.9)

This invention relates to a method for inhibiting the polymerization of acrylonitrile.

An object of this invention is to prevent the polymerization of acrylonitrile in storage at ordinary temperatures and also under conditions of elevated temperatures, such as those encountered during distillation of acrylonitrile. It is also an object to overcome certain disadvantages such as the dark color imparted by inhibitors previously used. A compound suitable for this purpose should inhibit the polymerization of monomeric acrylonitrile in the absence of polymerization catalysts but should not inhibit polymerization during the catalyzed polymerization of acrylonitrile when it is desired to prepare polymeric compositions.

I have discovered that hydroquinone monobenzyl ether, having the formula:

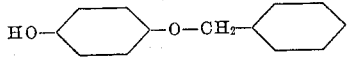

will inhibit the polymerization of acrylonitrile without the formation of a prominent color in the inhibited solution. It is thus an advantage of this compound that acrylonitrile may be stored for long periods of time even under adverse conditions, such as in the presence of oxygen without solidifying or polymerizing. It has also been found that the hydroquinone monobenzyl ether does not adversely affect the polymerization of acrylonitrile in the presence of peroxide type catalysts which are conventionally employed in the polymerization of acrylonitrile when it is desired to prepare polymers and copolymers of acrylonitrile.

It has been found that hydroquinone monobenzyl ether dissolves readily in inhibitory concentrations in the acrylonitrile. It has been found that concentrations of the order of 0.5 to 1000 parts per million (p. p. m.) are effective for the inhibition of polymerization. A preferred range of concentration is from 2 to 50 parts per million.

Acrylonitrile containing hydroquinone monobenzyl ether may be subjected to elevated temperatures such as those encountered in tropical storage or during distillation of the monomeric acrylonitrile, and effectively inhibit the polymerization of the monomeric material. The inhibitor may be removed from the acrylonitrile when desired by a distillation step or by extraction with a suitable solvent such as a hydrocarbon oil. It is also contemplated that this inhibitor may be introduced into a distilling column in which acrylonitrile is being distilled in order to prevent the high temperature polymerization of acrylonitrile. This inhibitor may be introduced into the upper portion of the column so that it will be effective throughout the column. It is an advantage of the hydroquinone monobenzyl ether that it has a negligible color effect, particularly in the above concentrations so that the color of the acrylonitrile both in monomeric and in polymeric form is not seriously affected by the presence of the inhibitor. It is another advantage of this inhibitor that the compound is a relatively low cost chemical so that it may be employed to prevent the polymerization of monomeric acrylonitrile without greatly adding to the cost thereof.

When hydroquinone monobenzyl ether is used in acrylonitrile the inhibition of polymerization may be the result by several mechanisms, so that no limitations of any particular theory restrict the present invention. However, it would appear that one of the effects which occurs is the absorption of oxygen. In this way the inhibitor prevents the initiation of a free radical or chain type of polymerization. This is unlike the stabilization for storage of other vinyl compounds such as chlorinated ethylenes and other halogen compounds, wherein the stabilizer is added to reduce the amount of chemical decomposition and acid evolution.

In order to show the effectiveness of this inhibitor in comparison with other known inhibitors a test was carried out in which acrylonitrile containing the inhibitors to be compared was subjected to the oxygen bomb test, which is conventionally employed for determining the stability of gasoline in the presence of oxygen at high pressures. This test is carried out as follows:

Using a graduated cylinder, measure 25 ml. of acrylonitrile containing the inhibitor into the glass liner. Place the liner in the stainless steel bomb connected to a pressure recording gauge and close the bomb tightly. Add oxygen to a pressure of 100 pounds per square inch at room temperature. Place the bomb in a steam bath and note the pressure characteristics over a four-hour period.

As the bomb becomes heated, the pressure will rise gradually to about 140 pounds per square inch. If the sample is potentially unstable, the pressure, after leveling off, will drop, then increase rapidly, and the acrylonitrile will become a yellow solid polymer. If no sudden pressure drop is noted, and if no solid polymer is formed during the four-hour test period, the inhibitor is considered to be satisfactory.

The above test was applied to acrylonitrile containing the following inhibitors:

- Tertiary butyl catechol
- Hydroquinone
- Hydroquinone monobenzyl ether

The table below shows the concentration as well as the effect upon the acrylonitrile.

*Comparison of inhibitors*

Tertiary butyl catechol, 100 p. p. m., sample polymerized
Hydroquinone, 100 p. p. m., sample polymerized
Hydroquinone monobenzyl ether, 10 p. p. m., no polymer formed The above data show that the hydroquinone monobenzyl ether is effective at lower concentrations than the conventional inhibitors of the prior art. In addition to this superiority, in that a smaller amount of the inhibitor is necessary, the hydroquinone monobenzyl ether has the further advantages of negligible color formation. In addition to the above accelerated stability test carried out in the presence of oxygen at elevated temperatures and high pressures, it has been found that the present inhibitor is effective in prolonged storage under normal atmospheric conditions. Over extended periods the acrylonitrile inhibited with hydroquinone monobenzyl ether shows a freedom from solid matter (i. e., polymer) and discoloration.

What I claim is:

1. The method of inhibiting the polymerization of acrylonitrile which comprises incorporating therewith from about 0.5 to 1000 parts per million of hydroquinone monobenzyl ether.
2. The method of inhibiting the polymerization of acrylonitrile which comprises incorporating therewith from about 2 to 50 parts per million of hydroquinone monobenzyl ether.
3. As a composition of matter acrylonitrile containing from 0.5 to 1000 parts per million of hydroquinone monobenzyl ether dissolved therein.
4. As a composition of matter acrylonitrile containing from 2 to 50 parts per million of hydroquinone monobenzyl ether dissolved therein.

WILLIAM T. NICHOLS.

REFERENCES CITED

The following references are of record in the file of this patent:

UNITED STATES PATENTS

| Number | Name | Date |
|---|---|---|
| 2,481,080 | Castner et al. | Sept. 6, 1949 |

OTHER REFERENCES

Stirton et al., Chem. Abstracts, vol. 39, p. 2417 (1945).